United States Patent

[11] 3,589,115

| [72] | Inventors | Charles P. Taylor;<br>Delmar C. Harer, both of New Holland, Pa. |
|---|---|---|
| [21] | Appl. No. | 792,997 |
| [22] | Filed | Jan. 22, 1969 |
| [45] | Patented | June 29, 1971 |
| [73] | Assignee | Sperry Rand Corporation<br>New Holland, Pa. |

[54] HEADER SUSPENSION
8 Claims, 2 Drawing Figs.

[52] U.S. Cl. ............................................. 56/208
[51] Int. Cl. ....................................... A01d 67/00
[50] Field of Search ............................. 56/208–217

[56] References Cited
UNITED STATES PATENTS

| 3,151,429 | 10/1964 | Dyrdahl | 56/208 X |
| 3,306,014 | 2/1967 | Halls et al. | 56/208 X |
| 3,383,845 | 5/1968 | Hirsch et al. | 56/208 |
| 3,485,020 | 12/1969 | Soteropulos et al. | 56/212 |

Primary Examiner—Louis G. Mancene
Assistant Examiner—J. A. Oliff
Attorneys—Joseph A. Brown, John C. Thompson, James J. Kennedy and George C. Bower ABSTRACT: A header suspension has two header suspension assemblies attaching a header to a tractor. Each assembly has a pivotally connected lower link and a pivotally connected, spring loaded variable length upper link. Skid shoes at each end of the header rest on the ground to position the header for cutting crops. Hydraulic lifts raise the header to an inoperative transport position through a lift rod connected to the lower link and an arm pivotally mounted on the tractor. The lift rods limit the downward movement of the header on entering a depression in the ground.

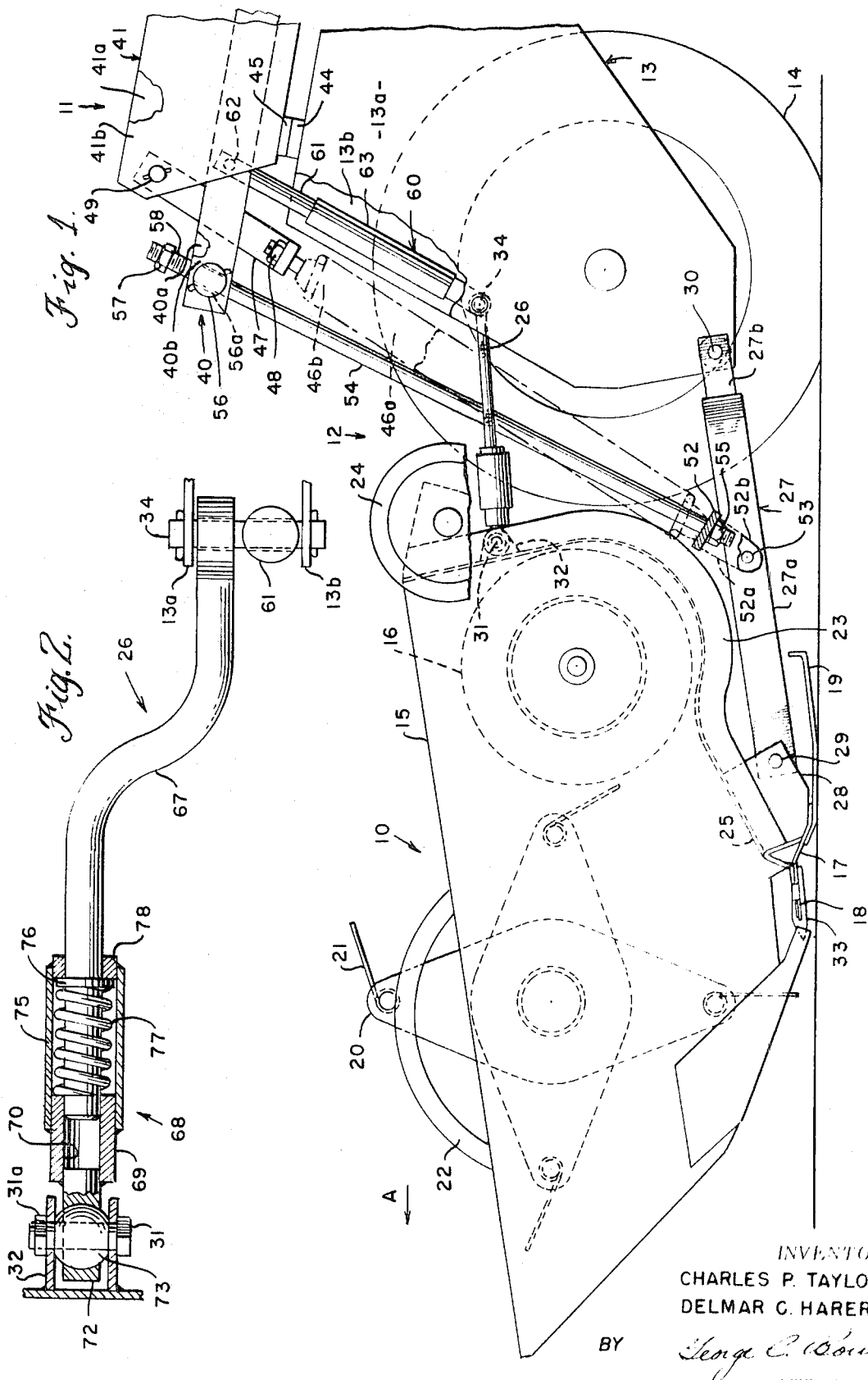

HEADER SUSPENSION

BACKGROUND OF THE INVENTION

This invention relates to agricultural harvesters and particularly to the suspension of headers on tractors, trail-type supports or the like.

In cutting of crops and forming windrows a tractor pushes or draws a header with a cutting bar. The header is movable between a raised position and a lowered position. In the lowered position the header rests on the ground and positions the cutting bar in proper cutting relation. A suspension connects the header to the tractor and has two suspension assemblies spaced transverse to the direction of travel. Each suspension assembly has an upper supporting arm or link and a lower supporting link. Both are pivotally connected to the tractor and header to move in a vertical plane parallel to the direction of movement of the tractor and header.

The cutting bar is close to the ground and has guards projecting forwardly of the blades for engaging obstacles such as rocks, boulders or the like. The tractor and header travel at a speed of several miles an hour and the guards forcefully hit these obstacles. With most of the present suspension systems on such an engagement the suspension assemblies articulate together and the links and arms pivot as the entire header raises to clear the obstacle. The lifting of the entire header applies a large force at the point of impact, delays the time of response, and increases the likelihood that the cutting bar will be damaged.

In some suspension systems the upper links are fixed in length and connected the header and tractor by complicated joints, such as universal joints, to permit transverse angular movement. These joints permit the upper links to angulate and one end of the header to lift off of the ground while the other end remains on the ground.

OBJECTS AND SUMMARY OF THE INVENTION

An object of this invention is to provide upper links for a header suspension that is simple in structure over present links and provides a limited twisting flexure between the header and tractor.

Another object of the invention is to provide a suspension link connected to a header and tractor by pivotal means operating in plane that permits the header to respond quickly in clearing an engaged obstacle.

More particularly another object of this invention is to provide a header suspension with variable length upper links resiliently biased to normally extended positions and individually responding to a compressing force towards a retracted position when the header encounters an obstacle.

In summary a header suspension comprises two suspension assemblies each having upper and lower support links with the upper arm or link having a spring loaded variable length which permits limited relative twisting of a header relative to the tractor.

These and other objects and advantages of this invention will be apparent from the following description and claims taken in connection with the accompanying drawing which illustrates the various features of this invention.

BRIEF DESCRIPTION OF THE DRAWINGS

FIG. 1 is a side view of a header connected by a suspension to a tractor fragmentarily shown.

FIG. 2 is an upward view of the upper left support link with the pivotal connection to the header and the spring loaded variable length portion shown in section.

DESCRIPTION OF THE PREFERRED EMBODIMENT

The header 10 of the auger type is attached to the tractor 11 by a suspension 12 and is driven in direction A to cut and deposit crops in windrows. The tractor 11 has two supporting frames 13 and two drive wheels 14 both spaced transverse to the direction of movement A with the wheels on the outer sides of the frames. The header is wider than the tractor and extends on each side beyond the frames and wheels for cutting a swath wider than the tractor. The suspension 12 is positioned between the wheels. The suspension comprises two transversely spaced suspension assemblies extending parallel to one another in the direction of movement. In FIG. 1 the wheel 14 on the left side of the tractor is omitted to fully illustrate the left suspension assembly. The two assemblies are identical in structure and operation. The description of one is equally applicable to the other. The frames 13 each have two side plate members 13a, 13b housing the drive means for the wheels 14.

The header has a housing 15 with a cutting bar 17 extending along the bottom between the sides. Curved supporting beams 23 extend down the rear wall 25 around the auger 16 to the cutting bar 17. A cutting sickle 18 extends across the header mounted on the cutting bar 17. The housing extends forwardly of the cutting bar and sickle to rotatably support the reel 20 with tines 21. The rotation of the tines is controlled by the cam 22 and is set according to the type and condition of the crop to be cut. The crops spanned by the header are swept into the cutting sickle 18 and up into the auger 16. The auger 16 also extends across the header and is rotatably mounted in the sides. The auger has opposed flights (not shown) to carry the cut crop to the center for discharge as a windrow through a center opening (not shown) in the rear wall 25. A fragment of the power takeoff 24 for driving the reel 20, sickle 18 and auger 16 is shown.

The header has skid shoes 19 at the ends for supporting the header on the ground with the cutting sickle 18 in proper cutting relation. The cutting sickle is close to the ground and has forwardly projecting guards 33 mounted on the cutting bar. The guards are uniformly spaced across the bar and forwardly in direction of movement to precede the cutting sickle. The guards hit obstacles projecting into the path of the cutting sickle and protect the cutting sickle from damage.

Each suspension assembly comprises a connecting linkage assembly and a suspension and lift assembly. The connecting linkage assembly comprises an upper link 26 and a lower link 27. The lower link 27 has a rectangular shaped tubular portion 27a and two generally parallel metal strips 27b extending longitudinally from the rectangular portion to form a fork overlapping the outer sides of the frame 13. The fork is pivotally connected thereto by the pin 30. At the other end the tubular portion 27a is pivotally connected on the header 10 to the bracket 28 by pin 29. The upper link 26 is pivotally connected by pin 34 to the tractor frame 13 and by the pin or bolt 31 to the bracket 32 on the header 10.

Each of the suspension and lift assemblies comprises two arms 40 and 41 pivotally mounted on the tractor frame 13 about pivot means (not shown). The arm 40 is formed by two metal platelike members 40a and 40b attached to the pivot means (not shown). The lift rod 54 and hydraulic lift 60 are pivotally connected to the arm.

The arm 41 has two transversely spaced platelike members 41a, 41b attached to the pivot means (not shown). At the front end there is a plate 45 engaging a stop 44 on the tractor frame 13. Lift springs 46a and 46b are attached to a T-shaped yoke 47 by fastening means 48. The yoke passes between the members 40a, 40b and is pivotally connected between the plates 41a and 41b by pin 49. At the other end the springs are attached to a U-shaped yoke 52 with legs 52a, 52b. The yoke is pivotally connected to an intermediate point of the lower link 27 by a pin 53 passing through the tubular portion 27a. The leg 52b is fragmentarily shown to better illustrate the connection of the lift springs 46a, 46b and the lift rod 54 to the U-shaped yoke piece 52. The lift springs resiliently support the header carrying the major portion of the header weight. The remainder of the weight is carried by the skid shoes 19. The lift rod 54 is connected to the U-shaped yoke means 52 between the lift spring 46a, 46b by fastening means 55. At the upper end the lift rod 54 passes between the members 40a, 40b and is slidably mounted in the bore 56a of the pin 56. A nut 57 is set on the threaded portion 58 on the upper end of the rod 54 to provide limited movement of the lift rod as the header moves over uneven ground but limiting the downward position of the header by the nut 57 engaging the pin 56.

The hydraulic lift 60 is between the members 13a, 13b. The cylinder 63 is pivotally connected to the frame 13 by the pin 34. At the upper end the piston rod 61 is pivotally connected to the arm 40 between the members 41a, 41b by the pin 62. To lift the header the hydraulic lift 60 is actuated raising the arm 40 against the nut 57. The lift rod 54 then picks the header up through the lower link 27. The arm 40 continues to rotate upward raising the header and engages the pin 49 in the arm 40 to raise the springs 46a,b with the header. The header is thus positioned for transport.

The links 27 are fixed in length. The links 26 are variable in length and comprise a rod 67 pivotally connected by the pivot pin 34 to the frame 13 (FIG. 2). At the other end it slidably fits into the mounting 68. The mounting 68 has a cylinder portion 69 with a bore 70 in which the end of the rod 67 slides to form a telescopic means with the mounting 68 to vary the length of the link. An eyelet member 72 extends from the cylinder portion to receive the spherically shaped member 73 for a limited slidable movement. The bolt 31 extends through the spherically shaped member 73 for pivotally mounting the link 26 to the bracket 32 on the housing 15. A nut 31a is threaded on the bolt 31 for securing it in place. A cylindrical sleeve 75 is welded to the cylindrical portion of the eyelet 72 and extends along the end of the rod 67. A flange 76 is held in a fixed position on the rod a distance from the slidably mounted end. A helical compression spring 77 is positioned between the end of the cylindrical portion 69 and the flange 76. The sleeve 75 has a collar 78 welded thereto. The compression spring 77 bears against one end of the cylinder portion 69 and the flange 76 to normally maintain the link 26 in its extending position, with the flange 76 abutting collar 78. On compression of the link 26, the slidable end of rod 67 seats against the flat end of the eyelet member 72 forming the bottom of the bore 70. On full extension, the flange and collar prevent separation. On opposite sides of the header are skid shoes 19 which extend rearwardly from behind the cutting bar 18. The tractor pushes the header on these skid shoes through the two suspension assemblies.

On engagement of an obstacle the upper support link on the side of the engagement shortens in length permitting the end of the header to raise. The header then moves over the obstacle. One of the skid shoes remains on the ground to support a share of the header weight. The skid shoes carry a lesser portion of the weight of the header in the order of seventy pounds. The suspension springs 46a, 46b carry most of and the remainder of the weight of the header. The guards 33 are firmly attached to the cutting bar which firmly attached to the header. An engaging force is applied to one or more of the guards which transmits the force to the cutting bar and frame. The engaged guard or guards assume the weight of the header carried by the skid shoe and, in lifting the header, overcomes the header rotational inertia and the loading of the spring 77. After passage the header drops and the raised shoe reengages the ground. The link 26 returns to the extended position. The engaged guard or guards not only bear the weight carried by the lift shoe but also lift a portion of the remaining weight of the header.

The header and tractor may be considered to have lateral planes extending in the direction of movement and normal to a longitudinal plane which is perpendicular to the ground. The suspension assemblies by means of the spring-loaded telescopic upper links provide a flexure of the header that permits the lateral plane of the header to twist relative to the lateral plane of the tractor. This lateral header flotation relieves excess stresses on the header and suspension assemblies when an obstacle is engaged by the cutting bar. This spring loaded variable length upper support arms or links of the suspension assemblies assist in cutter bar flotation and relieving the initial impact of the obstacle against the cutting bar and header.

From another point of view, upper links 26 may be considered to form an upper linkage assembly and the lower links 27 may be considered to form a lower linkage assembly. The lower linkage assembly is fixed in length in direction of movement and in pivotal relation with the header and tractor. The upper linkage assembly in addition to being in pivotal relation with the tractor and header is variable in length in the direction of movement. This flexibility permits one side of the upper linkage to shorten and one side of the header to lift off the ground while the other side remains on the ground.

While the invention has been described, it will be understood that it is capable of further modifications and this application is intended to cover any variations, uses, or adaptations of the invention following in general, the principles of the invention and including such departures from the present disclosure as come within known or customary practice in the art to which the invention pertains, and as may be applied to the essential features hereinbefore set forth and as fall within the scope of the invention or the limits of the appended claims.

Having thus described our invention, what we claim is:

1. In combination with a tractor and a header having crop cutting means, a suspension connecting said header to said tractor and comprising two suspension assemblies spaced-apart laterally of the direction of cutting movement, each suspension assembly having upper and lower support links, said upper and lower support links being pivotally connected at respective ends to said header and said tractor and being in vertically spaced and generally parallel relation, said upper links each being formed by two portions moveable lengthwise in relation to one another and having resilient means forcing said respective portions to distended position, said portions of one upper link operating independent of said other upper link for upward movement of one side of said header and rotation of said header in relation to said tractor on application of greater force to one side of header than to the other side of said header.

2. In the combination as set forth in claim 1 wherein said portions of said respective upper links are in telescopic relation.

3. In the combination as set forth in claim 1 wherein said portions of said upper links are sleeve portions and end rod portions fitting in said respective sleeve portions for relative movement of said sleeve portions and said end rod portions and said resilient means engage said end rod portions and said sleeve portions for urging said upper links to extended positions.

4. In the combination as set forth in claim 3 wherein, for each upper link, said end rod portion as a flange and said sleeve portion has a stepped portion and said resilient means is positioned therebetween.

5. In the combination as set forth in claim 4 wherein said resilient means is a helical spring.

6. In combination as set forth in claim 1 wherein each of said upper links have two portions in telescopic overlapping relation and resilient means within the overlapping relation and engaging said portions for resilient motion of said upper links.

7. In combination with a tractor and a header having a cutting bar with forwardly projecting guards, a suspension connecting said header to said tractor comprising an upper linkage assembly and a lower linkage assembly, said lower linkage assembly being pivotally connected to said header and tractor at lower portions thereof, said upper linkage assembly comprising two links extending in direction of movement of said tractor and header and spaced transversely on opposite sides of the main longitudinal plane of said header and tractor, said links being in generally parallel operative relation with said lower linkage assembly and variable in length with resilient means urging said links to the extended length and shortening under resilient pressure for permitting one side of said header to lift and rotate in relation to the other side of said header and to said tractor on engagement of an obstacle by said guards on said cutting bar.

8. In the combination as set forth in claim 7 wherein said two links of said upper linkage assembly each have a sleeve portion and an end rod portion slidably fitting in said sleeve portion for relative movement of said sleeve portion and said respective end rod portion and each have a helical spring engaging said end rod portion and said sleeve portion for urging said respective upper link to an extended position.